Figure 1:
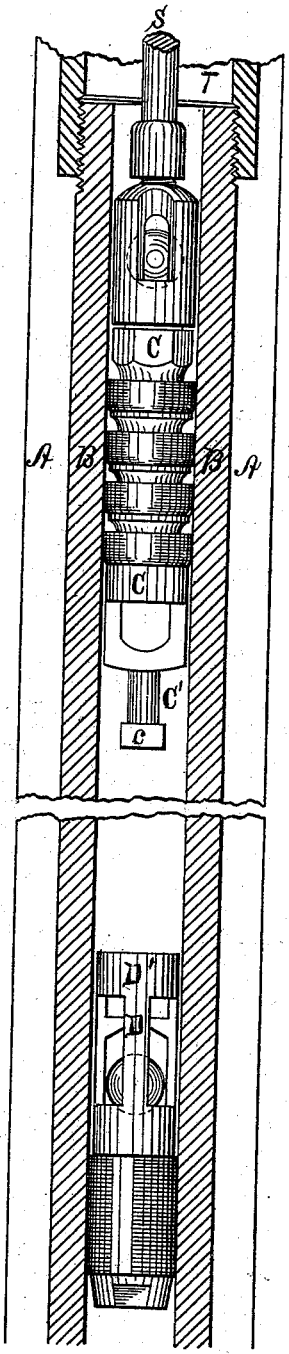

W. P. BLACK.
Apparatus for Drawing Valves from Oil-Well Pumps.
No. 214,751. Patented April 29, 1879.

Witnesses,
Jas. S. Miller
R. Porter

Inventor,
Willard P. Black
Per Jno. K. Hallock
Atty.

UNITED STATES PATENT OFFICE

WILLARD P. BLACK, OF PETROLIA, PENNSYLVANIA.

IMPROVEMENT IN APPARATUS FOR DRAWING VALVES FROM OIL-WELL PUMPS.

Specification forming part of Letters Patent No. 214,751, dated April 29, 1879; application filed June 7, 1878.

*To all whom it may concern:*

Be it known that I, WILLARD P. BLACK, of Petrolia, in the county of Butler and State of Pennsylvania, have invented a new and useful Device for Drawing the Valves from Oil-Well Pumps without removing the sucker-rods from the well; and I do hereby declare the following to be a full, clear, and exact description thereof.

The object and purpose of my invention will fully appear in the following statement of the art to which it relates.

In the production of oil from oil-wells the crevices or pores of the oil-rock in time become clogged by the accumulation of paraffine or gummy matter, and the supply of oil is thus retarded.

In those wells from which the oil is pumped the valves of the pump are sometimes removed and the superincumbent fluid is allowed to rush down and flood the well, and thus wash out the gummy accumulations.

The operation of removing these valves has heretofore been as follows: The sucker-rods and the working valve are drawn out, the valve removed, and a tap attached. The rods are then lowered into the well and the tap screwed into the fixed or bottom valve, and it is then withdrawn.

The experiment has been tried of providing the lower end of the working valve with a male screw and the upper end of the fixed valve with a female screw, and when it was desired to draw the valves the working valve was lowered onto the fixed valve and the connection of the screws effected and the valves withdrawn; but this method has not proved successful, for the reason that these screws become clogged, and, as it is inevitable that the valves in working shall be prevented from occasionally pounding together, the screws become battered, and it is found almost impossible to screw the parts together; and it is found when a connection is thus made that it is impossible to disconnect them without removing the sucker-rods for that purpose.

The various joints of the sucker-rods are connected by socket screw-joints, and, while they will serve to screw the tap or the upper valve into the lower one, the operation of unscrewing is as liable to unscrew a joint of the rods as the screw in the valve. Hence, in any case a removal of the sucker-rods is necessary. As these wells are often from fifteen hundred to two thousand feet deep, this operation of removing the rods wastes a great deal of time, and in the only successful method yet practiced—viz., that of using a tap—the rods have to be removed twice at least, once to attach the tap and once to detach the lower valve and tap.

The object of my invention is to do away with this necessity of removing the sucker-rods at all.

My invention consists in providing the valves with means whereby they can be coupled together while in the working barrel of the pump, and while so coupled can be removed from said working barrel far enough to allow the superincumbent fluid to rush past them and flood the well, after which they can be again lowered into the working barrel, and the fixed valve be reseated and then be uncoupled, and both valves be in readiness for pumping without removing the sucker-rods from the well. While it is possible that, under the most favorable circumstances, with the screw on one valve and screw-socket on the other, as above described, this result may have been accomplished, yet its continual and certain accomplishment by those means has been proved to be impossible.

While a screw-socket is in one sense an attachable and detachable coupler, it is not in the full sense of my invention, for it will not certainly perform all the functions required, and perform them in the place, in the manner, and at the time required.

Figure 2:
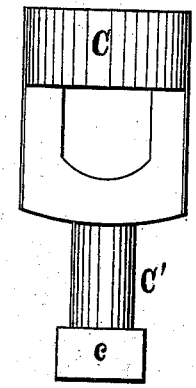
Figure 3:
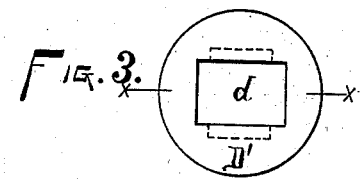
Figure 4:
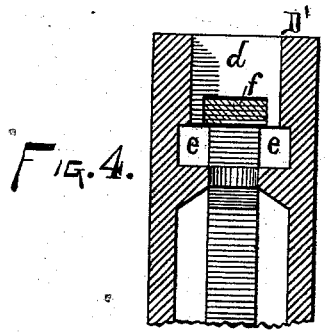

My invention is illustrated in the accompanying drawings, as follows: Figure 1 shows the arrangement of the pump and valves in the well, and shows a proper coupling device in connection with the valves. Fig. 2 is a side view of that part of the coupler which is attached to the working valve. Fig. 3 is a top view of the part of the coupler on the fixed valve. Fig. 4 is a section of the part shown in Fig. 3 on the line $x\,x$.

A represents the bore of the well; B, the pump-barrel; C, the upper or working valve, and D the fixed or lower valve. S is the sucker-rod, and J the tubing above the pump. C' is the part of the coupler upon the upper valve, and D' that upon the lower valve. The parts of this coupler are somewhat like the parts of a swivel. The part C' has a pin with an oblong cross-head, c, and the part D' has a chamber, e, with an opening to it from above, d, which is of the form of the cross-head c. The chamber e is provided with a recess, f.

When the cross-head of the part C' is in the chamber of the part D' it can be turned at right angles to the opening d, and will then, as it is pulled up, enter the recess f. This forms a lock-joint or coupler, which can at all times be certainly coupled and uncoupled while in the bottom of the well.

I do not desire to be restricted to the use of this particular form of joint or coupler, as it may have many variations in form and style.

The essence of the invention consists in providing the valves C and D with devices whereby they can be connected and disconnected while within the pump by a movement of the sucker-rod, and that without revolving the sucker-rod sufficiently to endanger the unscrewing of its joints.

What I claim is—

1. The arrangement, upon the valves of an oil-well pump having a working barrel of less interior diameter than that of the tubing or a chamber in said tubing, of a device whereby said valves can be coupled while in the bottom of the well, thus allowing the said valves to be raised from the pump-barrel sufficiently to allow the superincumbent fluid to rush past them and flood the lower part of the well, and said coupling, uncoupling, and flooding are accomplished without removing the sucker-rods, and without revolving the same sufficiently to endanger the unscrewing of their joints, substantially as set forth.

2. The arrangement, upon the valves of an oil-well pump having an enlarged portion above the working barrel, of a device whereby said valves can be coupled while in the bottom of the well and locked, thus allowing the said valves to be raised from the pump-barrel sufficiently to allow the superincumbent fluid to rush past them and flood the lower part of the well, and said coupling, uncoupling, and flooding are accomplished without removing the sucker-rods, and without revolving the same sufficiently to endanger the unscrewing of their joints, substantially as set forth.

3. The combination of the tubing J, working barrel B, and a working valve having pin C and cross-head c with a lower valve having the part D', provided with recess f and chamber e, substantially as set forth.

In testimony whereof I, the said WILLARD P. BLACK, have hereunto set my hand.

WILLARD P. BLACK.

Witnesses:
JNO. K. HALLOCK,
T. CURTZE.